United States Patent [19]

Ollenik et al.

[11] Patent Number: 4,771,092

[45] Date of Patent: Sep. 13, 1988

[54] PROCESS FOR THE PRODUCTION OF FREE-FLOWING RUBBER POWDERS WITH SILICIC ACID AS FILLER

[75] Inventors: Reiner Ollenik, Marl; Walter Kleinert, Velen; Michael F. Mueller, Muenster, all of Fed. Rep. of Germany

[73] Assignee: Huels Aktiengesellschaft, Marl, Fed. Rep. of Germany

[21] Appl. No.: 86,453

[22] Filed: Aug. 18, 1987

[30] Foreign Application Priority Data

Aug. 19, 1986 [DE] Fed. Rep. of Germany ....... 3628120

[51] Int. Cl.[4] .......................... C08K 3/36; C08K 5/00; C08L 7/00; C08L 9/00
[52] U.S. Cl. .................................... 524/99; 523/209; 524/236; 524/442; 524/492; 524/575
[58] Field of Search ............... 524/442, 492, 575, 236, 524/99; 523/209

[56] References Cited

U.S. PATENT DOCUMENTS

| | | |
|---|---|---|
| 3,235,331 | 2/1966 | Nauroth et al. . |
| 4,001,379 | 1/1977 | Turk et al. . |
| 4,003,981 | 1/1977 | Turk et al. . |
| 4,070,286 | 1/1978 | Iler et al. . |
| 4,105,426 | 8/1978 | Iler et al. . |
| 4,202,813 | 5/1980 | Wason .................. 524/493 |
| 4,250,082 | 2/1981 | Sommer et al. ........ 524/571 |
| 4,357,439 | 11/1982 | Blumel et al. ......... 524/493 |
| 4,482,657 | 11/1984 | Fischer et al. ........ 524/236 |
| 4,567,231 | 1/1986 | Huebner et al. ....... 524/837 |
| 4,659,607 | 4/1987 | Kataoka et al. ....... 428/143 |

FOREIGN PATENT DOCUMENTS 1342001 12/1973 United Kingdom .

Primary Examiner—Herbert J. Lilling
Attorney, Agent, or Firm—Millen & White

[57] ABSTRACT

A process for the production of free-flowing rubber powders with silicic acid as filler comprises combining a rubber latex with silicic acid filler while stirring in the presence of specific auxiliary agents, adjusting the pH range of the mixture to cause coagulation, and separating and drying the resultant solids wherein the specific auxiliary agents comprise organic surfactants together with colloidal silicic acid.

21 Claims, No Drawings

PROCESS FOR THE PRODUCTION OF FREE-FLOWING RUBBER POWDERS WITH SILICIC ACID AS FILLER

RELATED APPLICATIONS

This application is related to copending U.S. application Ser. Nos. 020,928, filed Mar. 2, 1987; 020,929, filed Mar. 2, 1987, now abandoned; and Ser. No. 021,031, also filed Mar. 2, 1987. The disclosures of these three, applications are herein incorporated by reference.

BACKGROUND OF THE INVENTION

The advantages of free-flowing rubber powders containing fillers compared with the conventional bale mixture have often been described in the literature (see, for example, U.S. Pat. No. 4,250,082). Mainly carbon blacks at all levels of activity are commonly used as fillers in the rubber industry. However, the use of light fillers, preferably the highly active silicic acid ($SiO_2$), is also known.

Most prior art processes for the production of rubber powders with silicic acid as filler occur by treating mixtures of rubber latex and water glass (i.e., sodium silicate) with acids or acidic salts in the presence of large amounts of neutral electrolytes, removing the resultant precipitate, washing it salt-free and drying it. The main disadvantage of this so-called in-situ precipitation procedure is that large amounts of waste water, loaded with organic materials and electrolytes, are accumulated. A further disadvantage is that the rubber powders accumulate in very fine particles (see No. DE-PS 20 30 172, column 1, lines 63 and 64) and thus have a tendency to give off undesired dust during processing.

The disadvantages of in-situ precipitation were able to be overcome through earlier work, but with the limitation that sufficient filler degrees, which are significant for the direct processing of rubber powders with silicic acid as fillers, could not be achieved.

By the process in U.S. patent application Ser. No. 020,928 rubber powders were successfully produced with silicic acid as a filler which exhibited the desired rubber-silicic acid ratio and, at the same time, exhibited good powder engineering qualities relative to free-flowing, dust-free and storage stability properties. The process is, however, limited to the use of silicic acids with a specific grain size distribution.

SUMMARY OF THE INVENTION

An object of the present invention is to develop a process which produces a rubber powder with silicic acid as a filler having the above-described qualities of free-flowing, dust-free, and storage stability, but does not require the use of silicic acid with a specific grain size distribution. Thus, by this process, it is possible to optimize the separate production of silicic acid and the production of rubber powder in which the silicic acid is a filler.

Upon further study of the specification and appended claims, further objects and advantages of this invention will become apparent to those skilled in the art.

These objects are achieved by addition of specific auxiliary agents during the formation of the rubber latex and silicic acid filler mixture. Thus, in one aspect, the invention relates to, in a process for the production of free-flowing rubber powder containing silicic acid as filler comprising combining a rubber latex with silicic acid filler while stirring, to form a mixture, the improvement wherein an organic surfactant and colloidal silicic acid are also included in said mixture.

For the process according to the invention, suitable rubber latices are, on the one hand, those based on natural rubber and degraded natural rubber (see GB-PS No. 749 955 and U.S. patent application Ser. No. 021,031) and, on the other hand, those made of homopolymers and copolymers of conjugate dienes produced through free radical polymerization using an emulsifier according to processes known in the prior art (see, for example, Houben-Weyl, Methoden der organischen Chemie [Methods of Organic Chemistry], Volume XIV/1, (1961), "Production of Rubbers," page 712 ff; Ullmanns Enzyklopaedie der technischen Chemie [Encyclopedia of Technical Chemistry], 13th Volume (1977), pages 595 to 635, as well as DE-PS No. 679 587, DE-PS No. 873 747 and DE-PS No. 1-130 597). Suitable conjugate dienes are 1,3-butadiene, isoprene, piperylene, 2-chloro-1,3-butadiene, 2-methyl-1,3-butadiene, and 2,3-dichloro-1,3-butadiene and 2,3-dimethyl-1,3-butadiene. The copolymers can be produced from mixtures of these conjugate dienes as well as from mixtures of these conjugate dienes with vinyl compounds, such as, for example, styrene, alpha-methyl styrene, acrylonitrile, acrylic acid, methacrylic acid and vinyl pyridine. In the process according to the invention, a styrene-butadiene latex with a styrene portion of about 10 to 30% by weight is preferably used. The solids content of the latices generally comprises about 20 to 25% by weight.

The activity of the silicic acids used as fillers is usually determined through the surface determination according to BET (J. Amer. Soc. 60, 309 (1938)) and is about 80 to 250 $m^2/g$, preferably about 130 to 200 $m^2/g$. The samples used for measurement are taken at a pH of about 6 to 7 from the silicic acid precipitate.

An additional important characteristic of rubber fillers is structure. The term "structure" is defined as the ability of silica to hold water in its wet cake. It is usually determined by DBP adsorption according to ASTM D 2414-79 or by the residual moisture of the filter cake of the silicic acid precipitate. Suitable silicic acids are those with high structure, i.e., with DBP numbers of about 220 to 380 ml/100 g or filter cake moisture of about 75 to 86%. Since in the present process the silicic acid is used preferably in the form of largely salt-free (less than 3%) washed filter cakes from the silicic acid precipitate, the filter cake moisture as a structural quantity is preferred to the DBP number. Such silicic acids can, for example, be produced according to the processes of DE-PS No. 1 467 019 and DE-DS No. 1 767 332, herein incorporated by reference.

The grain size distribution of the silicic acids that can be used as fillers need not be mentioned since they automatically result from the setting of the structure (see for example DE-PS No. 17 67 332). Further, an advantage of the process according to the invention is that no characteristic grain size distribution must be maintained.

The silicic acid (precipitate) is generally used in amounts between 30 and 120 phr (parts by weight per hundred parts by weight of rubber), preferably between 40 and 60 phr, based on the amount of rubber in the final rubber powder.

An essential feature of the present process is the presence of specific auxiliary agents during the combination of the rubber latex with the silicic acid used as a filler. These specific auxiliary agents include an organic surfactant and a colloidal silicic acid.

The first group of essential auxiliary agents is the surfactants. They are all organic cationic and nonionic compounds. Preferably, the surfactants are the so-called flocculating agents or precipitants. Further details on these surfactants are found in the monograph "The Chemistry of Silica" by Ralph Iler, John Wiley and Sons, New York, 1979. pages 384 to 396, herein incorporated by reference.

Cationic surfactants which can be used are, on the one hand, the usual cationic surfactant monomeric compounds, and on the other hand, cationic polymers. The main suitable cationic surfactants are quaternary alkyltrimethyl ammonium halides, alkylaryl ammonium halides and alkyl pyridinium halides, preferably chlorides and bromides, wherein the alkyl radical contains 8–20 C-atoms, preferably 12–20 C-atoms. Typical representatives of the individual groups of compounds are cetyl trimethyl ammonium bromide, cetyl dimethylbenzyl ammonium chloride and tetradecyl pyridinium bromide. Suitable aryl groups are phenyl and naphthyl.

Suitable cationic polymers for the process according to the invention are preferably high-molecular weight polyamines which contain quaternary nitrogen atoms such as disclosed in U.S. application Ser. No. 020,929 (see also, Kirk-Othmer, Encyclopedia of Chemical Technology, 3rd Edition, Vol. 10, pages 489 to 523 (1980)). Compounds which exhibit a basic structure of the following general formula are mainly used here:

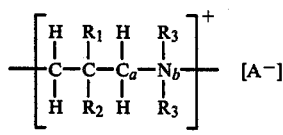

wherein:
$R_1$ is H- when $a=0$, $b=0$ or 1;
$R_1$ is OH- when $a=b=1$;
$R_1$ is $C_1$ to $C_3$ alkyl radical when $a=b=0$;
$R_2$ is H- when $a=0$ or 1, and $b=1$;
$R_2$ is

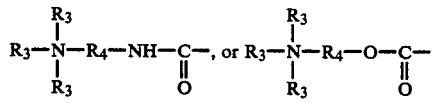

when $a=b=0$;
$R_3$ is H- or $C_1$ to $C_6$ alkyl radical when $a=b=0$, $a=b=1$, $a=0$ and $b=1$; and
$R_4$ is $C_1$ to $C_{12}$ alkyl radical when $a=b=0$.

The amines are straight-chain but can also be branched at the nitrogen atom.

$A^-$ stands for anions such as a halide, preferably chloride or bromide, sulfate, hydrogen sulfate, phosphate, acetate, oxalate, hydroxyl or the like.

The molecular weight of these polyamines ranges from about $10^4$ to $10^8$, preferably $10^4$ to $8\cdot10^6$. The indicated molecular weights are expressed as weight averages.

High-molecular weight polyamines with $R_1=OH-$, $R_2=H-$, $R_3=H$ or a $C_1$ to $C_6$ alkyl radical with $a=b=1$ are preferred. The molecular weight of these polyamines generally ranges from about $10^4$ to $8\cdot10^5$, preferably $10^4$ to $2\cdot10^5$. A typical representative of this group is a polyhydroxyalkyl amine which is sold by the firm American Cyanamid under the trademark SUPERFLOC® C 567.

The following groups of materials are representatives from among the numerous organic nonionic surfactants: fatty alcohol polyglycol ethers, alkylphenol polyglycol ethers, fatty acid polyglycol esters, fatty acid alkylolamides, fatty acid amide polyglycol ethers, addition products of ethylene oxide and/or propylene oxide, fatty amine polyglycol ethers and cellulose derivatives such as hydroxyalkyl cellulose. The fatty alcohol polyglycol ethers are preferred. A typical representative of this group is the compound cetyl $—(CH_2—CH_2—O)_{20}—H$.

The surfactants can be used individually or as mixtures of the individual compounds. The surfactants are generally used in amounts varying from about 0.3 to 10, preferably 0.5 to 4 phr, based on the amount of rubber in the final rubber powder.

Besides the surfactant(s), the addition of a colloidal silicic acid is critical to the process. In the framework of this invention, nonionic or anionic stabilized silica sols with grain sizes of about 2 to 100 nm, preferably 4 to 30 nm, are included. Details on the many methods of producing colloidal silicic acids can be gathered from the monograph already cited of Ralph Iler, pages 331 to 343, as well as from DE-PS No. 26 41 548, herein incorporated by reference.

The colloidal silicic acid is generally used in amounts of about 0.5 phr to 6 phr, preferably 1 to 3 phr, based on the amount of rubber in the final rubber powder. In this connection, it is a special advantage of the process according to the invention that silica sols with concentrations under 10% of $SiO_2$ can also be used. Such sols are usually produced from a diluted (less than 10% of $SiO_2$) water glass solution, by treating them with an acid ion exchanger (Lehrbuch der anorganischen Chemie [Textbook of Inorganic Chemistry] by Hollemann-Wibert, 1985, page 763). Generally, the silica sols employed as the colloidal silicic acid in the process of the invention, have a $SiO_2$ concentration of about 0,5 to 60%, preferably 2 to 40%

In general, the process according to the invention comprises adding the surfactants, colloidal silicic acid and filler to a rubber latex, which is suitably at room temperature (18°–25° C.), while stirring. In this regard attention must be paid to make sure that the mixture has a pH which is outside the coagulation range of the latex. As previously mentioned, the silicic acid to be used as filler is preferably used in the form in which it precipitates out of the wash process during silicic acid production from water glass, i.e., as filter cake which has never been dried. Alternatively, this filter cake can be resuspended before being used, for simpler handling, whereby the solids content of the filler suspension should preferably be greater than about 10%. Generally, the solids content of the filler suspension is 5 to 15%.

In this first phase of the production process other auxiliary agents common in rubber technology, such as for example UV stabilizers and antioxidants, can also be added to the mixture. In adding any materials, attention should be paid to assuring a homogeneous, thorough mixing.

In the next phase, the homogeneous mixture is then adjusted to a specific pH range to coagulate the rubber latex (coagulation phase). When using nonionic surfactants, a final pH of about 1 to 5, preferably 1.5 to 4, is necessary. Cationic surfactants or polymers require a final pH of about 2 to 9. The most favorable pH range can be easily determined by a few trial tests. Mineral acids or mineral acid salts, preferably sulfuric acids, are usually used to adjust the pH. When certain cationic surfactants are used, it is sometimes unnecessary to add acid or salt for coagulation. In any event, in such cases the cationic surfactant must be introduced as the last component in the system to prevent premature coagulation.

Intensive stirring is important during the coagulation phase. Any stirring system suitable for dispersing is appropriate, for example slant blade, propeller, impeller and disk stirrers. Sharply shearing stirring elements, for example shearing turbines, can also be used. The peripheral speed of the stirrer types mentioned should be greater than 4 m/sec. The stirring time generally is in the range of a few minutes (3 to 15). Then the solid content is separated from the serum, optionally washed several times with water, substantially separated from the wash water, comminuted and dried while moving.

The free-flowing rubber powders obtained by the process according to the invention are used mainly for the production of vulcanized products in the field of engineering parts, for example seals, and in the production of shoe soles.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire text of all applications, patents and publications, if any, cited above and below are hereby incorporated by reference.

EXAMPLES

The process will be further described based on the following examples.

First the substances used and the test processes are summarized:

A. Substances

A.1 Latexes (L)

L 1: aging stabilized styrene-butadiene latex (type 1502 from Bunawerke Huels GmbH) with a styrene content of 23.5% and a solids content of about 22%.

L 2: Degraded natural rubber latex according to example 1 of the process of application Ser. No. 021,031.

L 3: Nitrile rubber latex with an acrylonitrile content of 23% and a solids content of 20%.

A.2 Silicic Acid Fillers (SAF)

(Unless otherwise indicated, a mostly salt-free, washed filter cake from the silicic acid precipitate is used.)

| | BET ($m^2/g$) | Grain Size Distribution (microns)[1] | | | | | Filter Cake Moisture[2] (%) |
|---|---|---|---|---|---|---|---|
| | | $d_{min}$ | $d_{10}$ | $d_{50}$ | $d_{90}$ | $d_{max}$ | |
| SAF 1 | 103 | 2.6 | 6.3 | 12.7 | 22.6 | 38.0 | 77 |
| SAF 2 | 114 | 1.7 | 4.8 | 8.9 | 16.0 | 27.0 | 77 |
| SAF 3 | 156 | 2.6 | 5.7 | 12.4 | 20.1 | 38.0 | 81 |
| SAF 4 | 177 | 3.7 | 9.7 | 38.7 | 135.0 | 150.0 | 81 |
| SAF 5 | 178 | 3.7 | 4.4 | 8.6 | 14.7 | 21.1 | 83 |
| SAF 6 | 205 | 2.6 | 7.2 | 19.7 | 35.1 | 75.0 | 80 |
| SAF 7 | 236 | 1.7 | 5.6 | 11.9 | 20.5 | 38.0 | 85 |

[1]The grain size distribution was determined according to the Microtrac-/Submicrotrac-Method (Powder Technology 14, 287-293 (1976)). In this, $d_{min}$ and $d_{max}$ mean, respectively, the smallest and largest occurring particle diameters and the values $d_{10}$, $d_{50}$ and $d_{90}$ mean that 10, 50 or 90% of the total volume comprises particles which are smaller or the same as the respectively indicated values.
[2]The filter cake moisture is determined from the weight difference between 100 grams of filter cake before and after two-hour drying at 105° C.

A.3. Surfactants (S)

S 1: 20% aqueous solution of a fatty alcohol polyglycol ether (MARLIPAL SU HUELS AG);

S 2: Polyamine (SUPERLOC C 567, American Cyanamid Company, used as a 1% aqueous solution;

S 3: High-molecular polyamine (ROHAGIT KF 720, Roehm Company GmbH), used as a 0.1% aqueous solution;

S 4: High-molecular polyamine (ROHAGIT KL 210, Roehm Company GmbH), used as a 1% aqueous solution;

S 5: 1% aqueous solution of cetyl trimethyl ammonium bromide.

A.4. Colloidal silicic Acids (CSA)

| | pH | $SiO_2$ Concentration (%) | Particle Diameter (nm) |
|---|---|---|---|
| CSA 1 | 10 | 30 | 25-30 |
| CSA 2 | 9-10 | 40 | 15 |
| CSA 3 | 9-10 | 30 | 7-8 |
| CSA 4 | 8-9 | 6 | 4 |

B. Testing Procedure

Jenike Test for Free-flowing Properties:

The measured quantity indicated in $N/m^2$ results from a shear test to determine the compressive strength of bulk goods according to Jenike and Johannson in the so-called Flow Factor Tester (evaluation see H. P. Kurz, Verfahrenstechnik [Process Technology] 10, pages 68 to 72, (1976)). The test was conducted immediately after loading the apparatus at 20° C. at the indicated compressive stress. Within the range of the selected compressive stresses the powders exhibited good free-flowing and ensiling properties at Jenike values below 1,000 $N/m^2$. In the range of 1,000 to 2,000 $N/m^2$, the powders exhibited satisfactory free-flowing properties and were still conveniently handled in the silo with discharge aids. At values above 2,000 $N/m^2$, the powders are regarded as cohesive, i.e., the free-flowing and ensiling properties are unsatisfactory.

EXAMPLE 1

1,628 g of the rubber latex L1 were placed in a 5-l beaker glass at room temperature and stirred at 8.3 revolutions per second (sec$^{-1}$). A 3-blade impeller stirrer with the diameter d=6 cm was used as a stirrer. The following were placed into this receiver in this order: 73 g of solution S1, 8 g of solution CSA 2, and 1,030 g of SAF 5. After successful addition the speed of the stirrer was raised to 28.5 sec$^{-1}$. 4 minutes later the pH of the mixture was adjusted from 2.5 to 1.5 by adding 50% $H_2SO_4$. The pH was determined with the aid of a pH meter of the Metrohm Company, Type E 520. The mixture was stirred another 5 minutes at the same speed after the addition of the acid. The solids content was then separated from the serum on a suction strainer and washed three times with 2 liters of water each. The filter cake was then coarsely divided and predried for 1 hour at 45° C. in a commercially available fluidized bed dryer with a stirring zone. Final drying occurred under vacuum (water jet pump) in the drying chamber (24 hours at 50° C.). A rubber powder with good free-flowing properties and with a Jenike value of 540 (compressive stress 2,700 N/m$^2$) was obtained.

Comparative Example A

Example 1 was repeated except that the addition of CSA 2 was eliminated. An inhomogeneous rubber-silicic acid mixture with an undesirably high portion of free, i.e., non-inserted, silicic acids was obtained. Working up of rubber powder was not possible.

Examples 2 to 11

The tests were conducted under the conditions indicated in Table 1 using the method described in example 1. The Jenike values of the rubber powders obtained are also indicated in Table 1.

acid on a roll mill (mixing temperature 50° C.) according to the following test formulation:

|  | Powder Rubber Mixture Parts by Weight | Bale Mixture Parts by Weight |
|---|---|---|
| Powder rubber of Example 3 | 100 |  |
| E-SBR with 23.5% styrene (A styrene-butadiene latex) |  | 100 |
| Silicic acid precipitate SAF 7 (dried and ground with a pinned disc mill) |  | 50 |
| Zinc oxide | 5 | 5 |
| Stearic acid | 2 | 2 |
| 2,6-di-tert-butyl-p-cresol | 1 | 1 |
| Diethylene glycol | 2.5 | 2.5 |
| Naphthenic plasticizer oil | 5.0 | 5.0 |
| 2.2'-dibenzothiazyl disulfide | 1 | 1 |
| N,N'—diphenylguanidine | 2 | 2 |
| Sulfur | 2 | 2 |

The vulcanization behavior and mechanical properties using the testing methods are summarized in Table 2.

The procedure used for vulcanizing the powder and the bale rubber mixture is well-known to one skilled in the art and is described in U.S. Pat. No. 4,250,082.

TABLE I

| Example No. | Latex type | Latex amount (g) | Filler type | Filler amount (g) | Surfactants type | Surfactants amount (g) | Colloid silicic acid type | Colloid silicic acid amount (g) | pH | Compression stress (N/m$^2$) | Jenike Value (N/m$^2$) |
|---|---|---|---|---|---|---|---|---|---|---|---|
| 2 | L1 | 1 628 | FKS 6 | 1 750 | S 1 | 54 | CSA 2 | 8.8 | 2.5–1.5 | 2 800 | 895 |
| 3 | L1 | 1 628 | FKS 7 | 1 160 | S 1 | 54 | CSA 1 | 35 | 2.5–1.5 | 2 500 | 780 |
| 4 | L1 | 1 628 | FKS 1 | 760 | S 1 | 54 | CSA 2 | 26.2 | 2.5–1.5 | 2 510 | 780 |
| 5 | L1 | 1 628 | FKS 2 | 760 | S 1 | 54 | CSA 2 | 26.2 | 2.5–1.5 | 2 560 | 650 |
| 6 | L1 | 1 628 | FKS 3 | 921 | S 1 | 54 | CSA 2 | 26.2 | 2.5–1.5 | 2 710 | 630 |
| 7 | L1 | 1 628 | FKS 4 | 921 | S 1 | 54 | CSA 2 | 26.2 | 2.5–1.5 | 2 700 | 530 |
| 8 | L1 | 1 628 | FKS 5 | 1 020 | S 1 | 54 | CSA 2 | 26.2 | 2.5–1.5 | 3 100 | 795 |
| 9 | L1 | 1 395 | FKS 1 | 625 | S 2 | 900 | CSA 1 | 33 | 3-2 | 2 000 | 710 |
| 10 | L3 | 1 500 | FKS 3 | 781 | S 4 | 900 | CSA 3 | 10 | 3-2 | 2 000 | 580 |
| 11 | L2 | 1 500 | FKS 6 | 705 | S 5 | 900 | CSA 3 | 30 | 7-6 | 2 000 | 1 095 |

Example 12

408 g of a suspension of SAF 7 with a solids content of 12% were placed in the apparatus described in Example 1 and stirred for 11 sec$^{-1}$. Then 16.5 g of CSA 4 and next 100 g of S 3 were added and the mixture was stirred for one minute. Then 500 g of L 2 were added and stirred for 2 minutes. Finally, 1,500 g of S 3 were added within 30 seconds. A pH between 8 and 7 was set.

Working up occurred as in Example 1. A Jenike value of 970 N/m$^2$ was determined at a compressive stress of 2,000 N/m$^2$.

Example 13

Example 1 was repeated except that SAF 6, a silicic acid resuspended after drying, was used as the filler in a 15% suspension. A Jenike value of 830 N/m$^2$ was determined at a compressive stress of 2,000 N/m$^2$.

Example 14 and Comparative Example B (Example for Application)

The rubber technology properties of the rubber powder containing fillers is to be illustrated by an example. 900 g of powder rubber and, as comparative example B, 600 g of bale rubber were processed with 300 g of silicic

TABLE 2

| Test Method |  | Powder Rubber Mixture | Bale Mixture |
|---|---|---|---|
| Mooney viscosity 100° C. | DIN 53 523 | 75 | 116 |
| Deformation Hardness | DIN 53 5145 | 1,900 | 2,850 |
| Vulkameter: t$_{10}$ (min) | DIN 53 529 | 4.0 | 4.1 |
| t$_{90}$ (min) | DIN 53 529 | 8.8 | 7.9 |
| Delta t (min) | DIN 53 529 | 4.8 | 3.8 |
| Heating 150° C. | (min) | 12 | 12 |
| Tensile Strength, Standard Ring I(MPa) | DIN 53 504 | 15.4 | 14.6 |
| Elongation at break, Standard Ring I (%) | DIN 53 504 | 689 | 651 |
| Modulus 100, Standard Ring I(MPa) | DIN 53 504 | 1.2 | 2.0 |
| Modulus 300, Standard Ring I(MPa) | DIN 53 504 | 2.6 | 4.4 |
| Modulus 500, Standard Ring I(MPa) | DIN 53 504 | 6.1 | 8.2 |
| Tension set, Standard Ring I(MPa) | DIN 53 511 | 30 | 40 |
| Notch tenacity, Standard Ring I (%) |  | 50 | 33 |
| Shore Hardness A at 22° C. | DIN 53 505 | 66 | 74 |
| Elasticity 22° C. | DIN 53 512 | 41 | 50 |

The comparison shows that the powder rubbers according to the invention are superior to the bale mixtures in processability (Mooney viscosity, deformation hardness), as well as in mechanical values (for example tensile strenght, tension set, notch tenacity).

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the production of free-flowing rubber powder containing silicic acid as filler comprising combining a rubber latex with silicic acid filler particles while stirring, to form a mixture, the improvement wherein an organic surfactant and colloidal silicic acid particles are also included in said mixture.

2. A process according to claim 1, further comprising adjusting the pH of the mixture to induce coagulation and separating and drying the resultant solids.

3. A process according to claim 1, wherein said silicic acid filler particles is produced by acidification of sodium silicate to form a resultant precipitate which is washed to a substantially salt-free condition and is combined with the latex without being dried.

4. A process according to claim 1, wherein said rubber powder comprises about 30 to 120 parts by weight of the said silicic acid filler particles per 100 parts by weight rubber.

5. A process according to claim 1, wherein said rubber powder comprises about 40 to 60 parts by weight of silicic acid filler particles per 100 parts by weight of rubber.

6. A process according to claim 1, wherein said organic surfactant is cationic.

7. A process according to claim 1, wherein said organic surfactant is nonionic.

8. A process according to claim 1, wherein the amount of organic surfactant added is about 0.3 to 10 parts by weight per 100 parts by weight rubber.

9. A process according to claim 1, wherein the amount of organic surfactant added is about 0.5 to 4 parts by weight per 100 parts by weight rubber.

10. A process according to claim 1, wherein the amount of colloidal silicic acid particles added is about 0.5–6.0 parts by weight per 100 parts by weight rubber.

11. A process according claim 1, wherein the amount of colloidal silicic acid particles added is about 1–3 parts by weight colloidal per 100 parts by weight rubber.

12. A process according to claim 1, wherein said rubber latex has a solids content of about 20–25% by weight.

13. A process according to claim 1, wherein said rubber latex is a styrene-butadiene latex having a styrene portion of about 15–30% by weight.

14. A process according to claim 1, wherein said organic surfactant is a quaternary alkyltrimethyl ammonium halide, a quaternary alkyl aryl ammonium halide, a quaternary alkyl pyridinium halide, or mixtures thereof, wherein the alkyl radical has 8–20 C atoms.

15. A process according to claim 1, wherein said organic surfactant is a high-molecular weight polyamine having a molecular weight of about $10^4$ to $10^8$.

16. A process according to claim 1, wherein in the preparation of said mixture said colloidal silicic acid particles are added in the form of silica acid suspension containing less than 10% by weight $SiO_2$.

17. A process according to claim 1, further comprising subjecting said rubber powder to a vulcanization step.

18. A process according to claim 1, wherein said colloidal silicic acid particles have a particles size of about 2–100 nm.

19. A process according to claim 1, wherein said colloidal silicic acid particles have a particle size of about 4–30 nm.

20. A process according to claim 18, wherein said silicic acid filler particles have a particles size range of about 1.7–150 μm.

21. A process according to claim 18, wherein said silicic acid filler particles are in the form of a filter cake.

* * * * *